US012410990B2

(12) United States Patent
Tyree et al.

(10) Patent No.: US 12,410,990 B2
(45) Date of Patent: Sep. 9, 2025

(54) LENS CAP ASSEMBLY

(71) Applicant: ONE HUNDRED CONCEPTS, LLC, Tunnel Hill, GA (US)

(72) Inventors: Jonah Tyree, Rocky Face, GA (US); Garrett Miller, Tunnel Hill, GA (US)

(73) Assignee: One Hundred Concepts, LLC

( * ) Notice: Subject to any disclaimer, the term of this patent is extended or adjusted under 35 U.S.C. 154(b) by 0 days.

(21) Appl. No.: 18/748,605

(22) Filed: Jun. 20, 2024

(65) Prior Publication Data

US 2024/0426575 A1 Dec. 26, 2024

Related U.S. Application Data

(60) Provisional application No. 63/523,015, filed on Jun. 23, 2023.

(51) Int. Cl.
*F41G 1/38* (2006.01)
*F21V 11/16* (2006.01)

(52) U.S. Cl.
CPC .............. *F41G 1/383* (2013.01); *F21V 11/16* (2013.01)

(58) Field of Classification Search
CPC ............. F41G 1/38; F41G 1/383; F21V 11/16
USPC .................................................. 359/511, 600
See application file for complete search history.

(56) References Cited

U.S. PATENT DOCUMENTS

| | | | | |
|---|---|---|---|---|
| 2,738,585 A * | 3/1956 | Vissing | G02B 23/16 | 42/129 |
| 3,426,433 A * | 2/1969 | Anderson | F41G 1/383 | 42/129 |
| 3,496,642 A * | 2/1970 | Pfahler | F41G 1/383 | 42/129 |
| 3,746,423 A * | 7/1973 | Mills | G02B 23/16 | 42/129 |
| 5,365,670 A * | 11/1994 | Klimochko | F41G 1/38 | 42/129 |
| 5,495,676 A | 3/1996 | Chesnut et al. | | |
| 5,617,257 A | 4/1997 | Sheehy et al. | | |
| 5,760,953 A | 6/1998 | Task et al. | | |
| 7,004,600 B2 | 2/2006 | Echterling | | |
| 7,128,436 B2 | 10/2006 | Bensinger et al. | | |
| 7,184,614 B2 * | 2/2007 | Slatkine | A61B 90/04 | 385/5 |
| 7,969,673 B2 | 6/2011 | Hanna et al. | | |
| 9,157,586 B1 | 10/2015 | Babcock, IV | | |
| 9,683,812 B2 * | 6/2017 | Hamilton | F41G 1/38 | |
| 12,152,860 B2 * | 11/2024 | Boston | F41G 1/383 | |
| 2005/0105187 A1 * | 5/2005 | Flora | G02B 23/12 | 359/600 |
| 2013/0129338 A1 * | 5/2013 | Dowell | G02B 1/14 | 359/511 |
| 2018/0100722 A1 * | 4/2018 | McDaniels | F41G 1/383 | |

(Continued)

FOREIGN PATENT DOCUMENTS

| | | | |
|---|---|---|---|
| EP | 1457756 A1 * | 9/2004 | F41A 35/02 |

*Primary Examiner* — Ricky D Shafer
(74) *Attorney, Agent, or Firm* — Asgaard Patent Services, LLC; F. Wayne Thompson, Jr.

(57) ABSTRACT

Disclosed are implementations of a lens cap assembly, each configured to shroud the lens of a device such as a flashlight, an optical sight, or a night vision device. Each lens cap assembly comprises a sleeve, either a removable lens or an anti-reflection element positioned within the sleeve, and a cap. The cap is removably secured to the sleeve by an elastic cord.

3 Claims, 12 Drawing Sheets

(56) References Cited

U.S. PATENT DOCUMENTS

| | | | | |
|---|---|---|---|---|
| 2021/0372737 | A1* | 12/2021 | Masarik ................ | H04N 23/11 |
| 2022/0074707 | A1* | 3/2022 | Dunning ................ | F41G 1/383 |

* cited by examiner

LENS CAP ASSEMBLY

CROSS-REFERENCE TO RELATED APPLICATION(S)

This application claims the benefit of U.S. Provisional Application Ser. No. 63/523,015, filed on Jun. 23, 2023, the entirety of which is incorporated herein by reference.

TECHNICAL FIELD

This disclosure relates to implementations of a lens cap assembly.

BACKGROUND

The lens of a flashlight, telescopic sight, or night vision device can be damaged by dust, debris, and impacts, which can scratch or crack the lens. Additionally, the highly reflective head of a weapon light, as well as the lens of a telescopic sight or night vision device, can reflect light that reveals the user's location. This is particularly concerning for users trying to conceal their position, such as warfighters.

In the case of a flashlight, protecting against accidental light discharges is crucial, especially for warfighters operating under night vision, where an unintended white light discharge could compromise a mission or endanger personnel. Therefore, it is important to safeguard these devices from physical damage and prevent reflections and accidental light emissions that could reveal the user's presence.

Accordingly, there exists a need for the lens cap assembly disclosed herein. The present invention is primarily directed towards providing a lens cap assembly configured to address these and other needs.

SUMMARY OF THE INVENTION

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed are implementations of a lens cap assembly, each configured to shroud the lens of a device such as a flashlight, an optical sight, or a night vision device. Each lens cap assembly comprises a sleeve, either a removable lens or an anti-reflection element positioned within the sleeve, and a cap. The cap is removably secured to the sleeve by an elastic cord.

An example lens cap assembly comprises a sleeve configured to frictionally engage with a flashlight head, a removable lens, and a cap. The sleeve has a bore disposed through it. A front end of the bore includes a radially inwardly projecting ledge defining a circular opening having a diameter that is less than a diameter of the bore. A front end of the sleeve includes an annular chamfer positioned around the circular opening defined by the radially inwardly projecting ledge. The removable lens is positioned within the bore against the radially inwardly projecting ledge of the sleeve. The cap is removably secured to the front end of the sleeve by an elastic cord. The cap includes a backside and an annular chamfer disposed on the backside configured to interface with the annular chamfer on the front end of the sleeve.

Another example lens cap assembly comprises a sleeve configured to frictionally engage with an optical sight, an anti-reflection element configured to filter out light reflections from a lens of the optical sight, and a cap. The sleeve has a bore disposed through it. A front end of the sleeve includes an annular chamfer positioned around an exit opening of the bore. The anti-reflection element is positioned within the bore of the sleeve. The cap is removably secured to the front end of the sleeve by an elastic cord. The cap includes a backside and an annular chamfer disposed on the backside configured to interface with the annular chamfer on the front end of the sleeve.

Yet another example lens cap assembly comprises a sleeve configured to frictionally engage with an objective end of a night vision device, a removable lens, a cap, and a sliding member. The sleeve has a bore disposed through it. The front end of the bore includes a radially inwardly projecting ledge defining a circular opening having a diameter that is less than a diameter of the bore. The front end of the sleeve includes an annular chamfer positioned around the circular opening defined by the radially inwardly projecting ledge. The removable lens is positioned within the bore against the radially inwardly projecting ledge of the sleeve. The cap is removably secured to the front end of the sleeve by an elastic cord. The cap includes a backside, an annular chamfer disposed on the backside configured to interface with the annular chamfer on the front end of the sleeve, and an aperture positioned to allow light to an objective lens of the night vision device. The sliding member includes at least one aperture. The sliding member is configured to move between a first position in which the sliding member covers the aperture of the cap and a second positioned in which the at least one aperture of the sliding member overlays the aperture of the cap. The aperture of the cap and the at least one aperture of the sliding member are configured together to change a focal distance of the night vision device.

BRIEF DESCRIPTION OF THE DRAWINGS

Like reference numerals refer to corresponding parts throughout the several views of the drawings.

DETAILED DESCRIPTION

Figure 1:
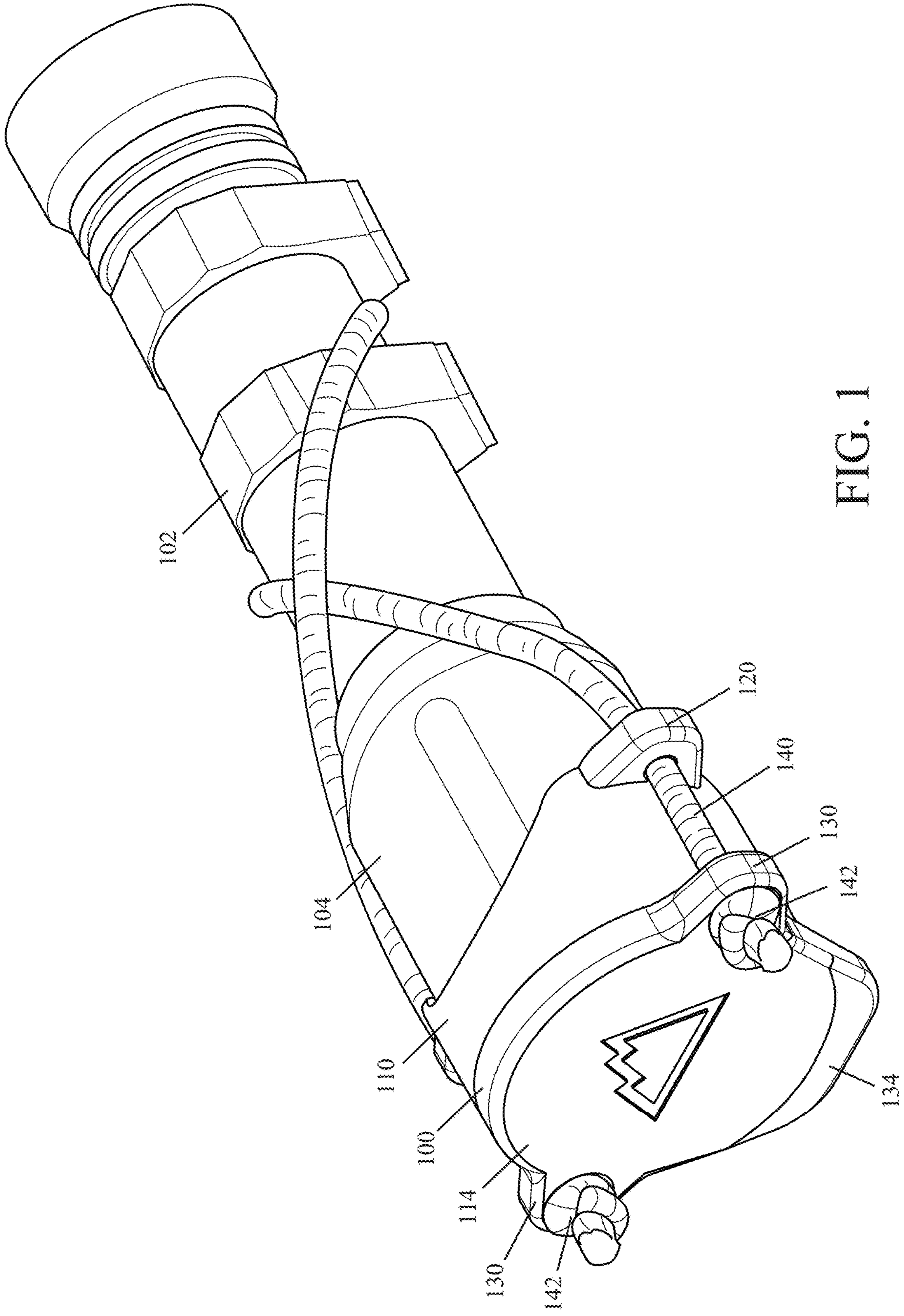
FIG. 1 illustrates an isometric view of a flashlight equipped with a lens cap assembly according to the principles of the present disclosure.

FIGS. 1-9 illustrate an example lens cap assembly 100 configured for attachment to a flashlight 102. As shown in FIG. 1, the lens cap assembly 100 is configured to shroud the head 104 of the flashlight 102 and thereby protect the lens and lamp assembly of the flashlight 102.

Figure 2:
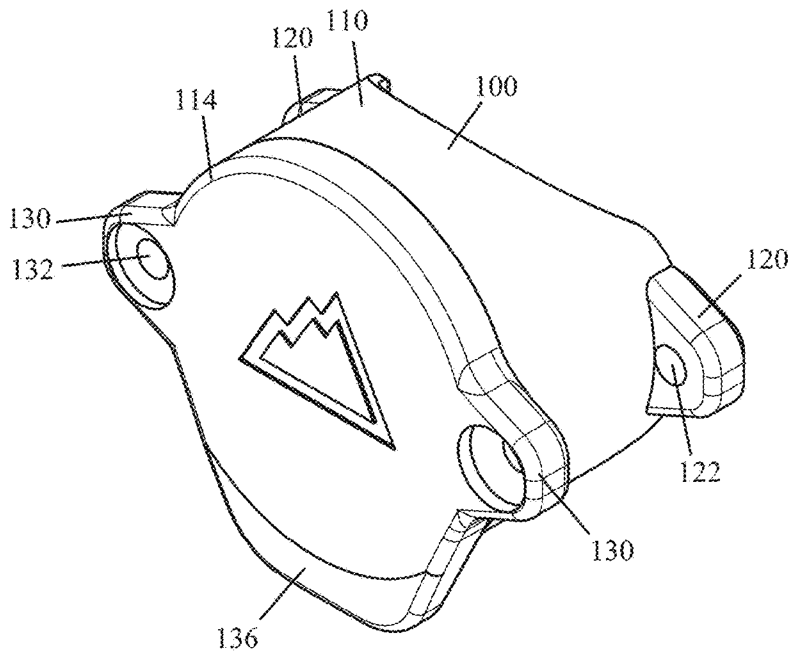
FIG. 2 illustrates an isometric view of the lens cap assembly shown in FIG. 1.
Figure 3:
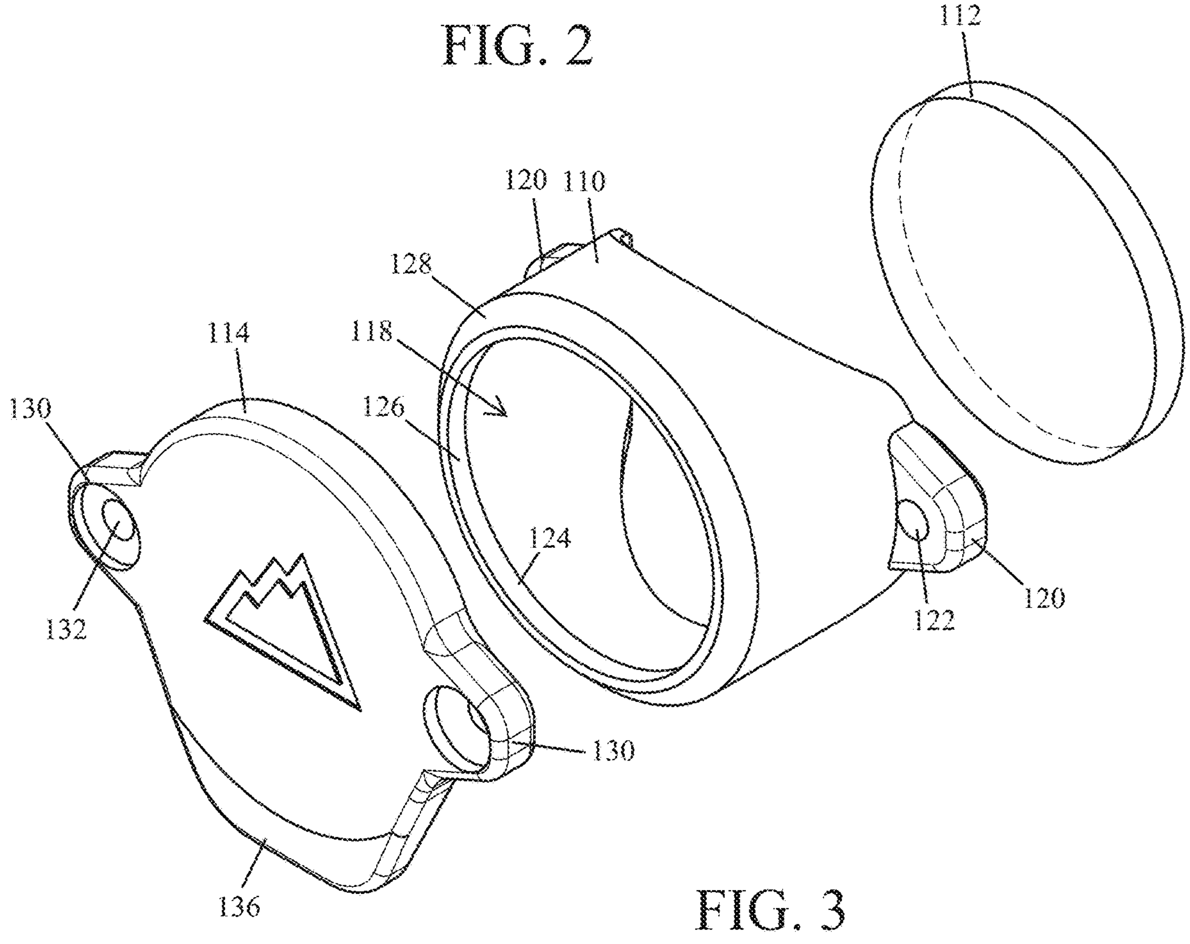
FIG. 3 illustrates an exploded view of the lens cap assembly shown in FIG. 2.
Figure 4:
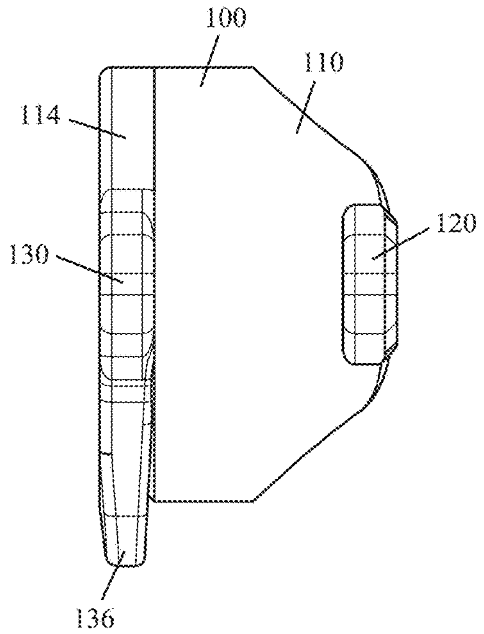
FIG. 4 illustrates a right side elevational view of the lens cap assembly shown in FIG. 2.
Figure 5:
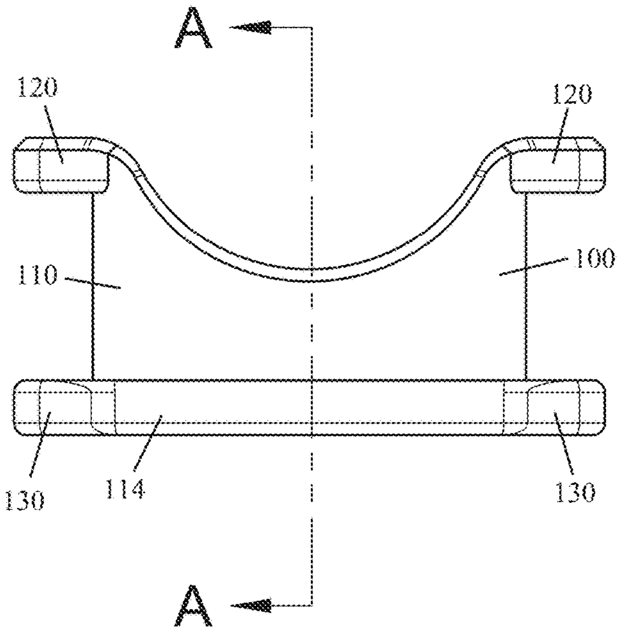
FIG. 5 illustrates a top plan view of the lens cap assembly shown in FIG. 2.

As shown best in FIGS. 2 and 3, the lens cap assembly 100 comprises a sleeve 110, a removable lens 112, and a cap 114. The removable lens 112 is press fit into position within the sleeve 110 and the cap 114 is attached to the sleeve 110 by an elastic cord 116.

The sleeve 110 is configured to frictionally engage with the flashlight head 104. A bore 118 is disposed through the sleeve 110; the diameter of the bore 118 will be only slightly larger than the diameter of the flashlight head 104 to which the lens cap assembly 100 is being attached, to allow for a tight, frictional engagement while retaining removability. A front end of the bore 118 includes a radially inwardly projecting ledge 124 that defines a circular opening 126, which has a diameter smaller than the diameter of the bore 118 (see, e.g., FIG. 6). A front end of the sleeve 110 includes an annular chamfer 128 positioned around the circular opening 126 defined by the radially inwardly projecting ledge 124 (see, e.g., FIG. 3). The sleeve 110 also includes two external tabs 120 that extend laterally from opposite sides. Each tab 120 includes a thru hole 122, the purpose of which will be described in detail below. The sleeve 110 is made of polyamide 12 (PA12). However, the sleeve 110 can be made of other suitable materials, such as a thermoplastic polyurethane.

Figure 6:
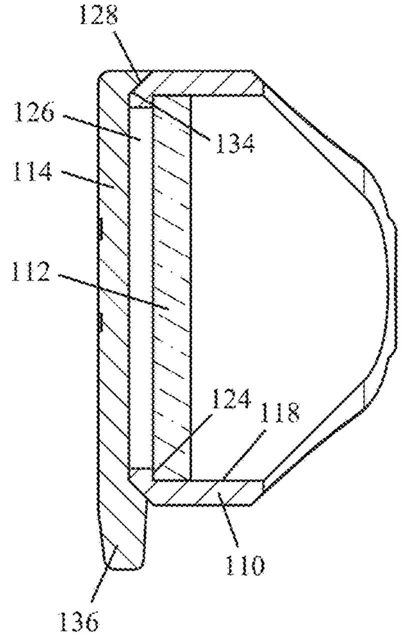
FIG. 6 illustrates a cutaway view of the lens cap assembly taken along line A-A shown in FIG. 5.
Figure 7:
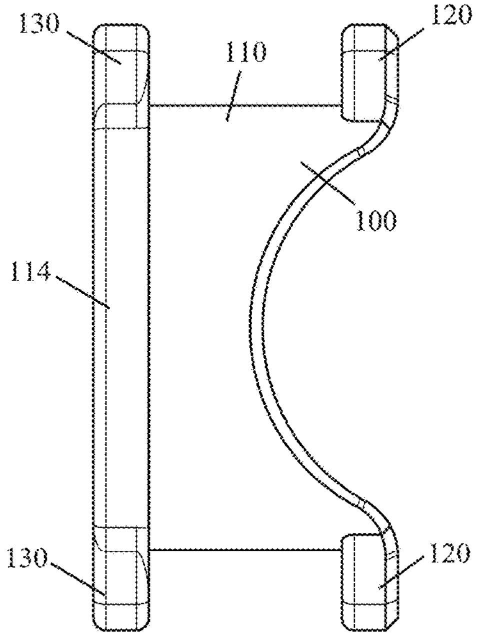
FIG. 7 illustrates another top plan view of the lens cap assembly shown in FIG. 2.
Figure 8:
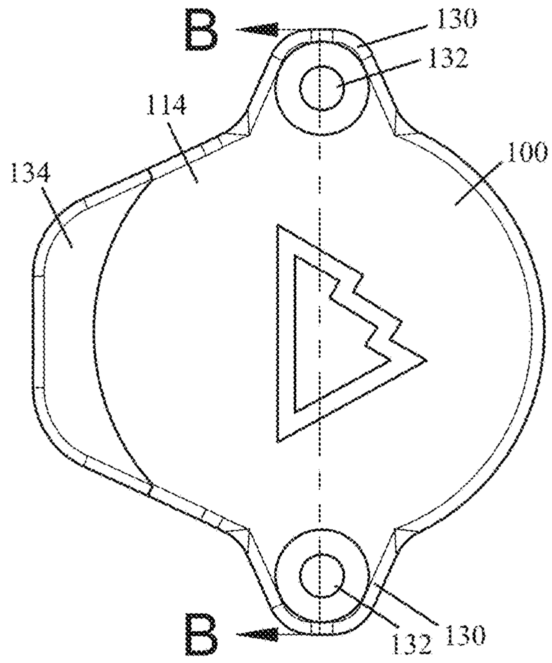
FIG. 8 illustrates a front elevational view of the lens cap assembly shown in FIG. 2.
Figure 9:
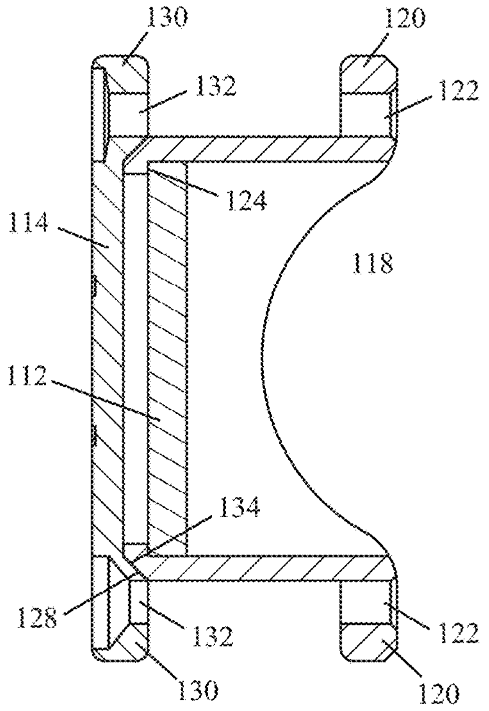
FIG. 9 illustrates a cutaway view of the lens cap assembly taken along line B-B shown in FIG. 8.
Figure 10:
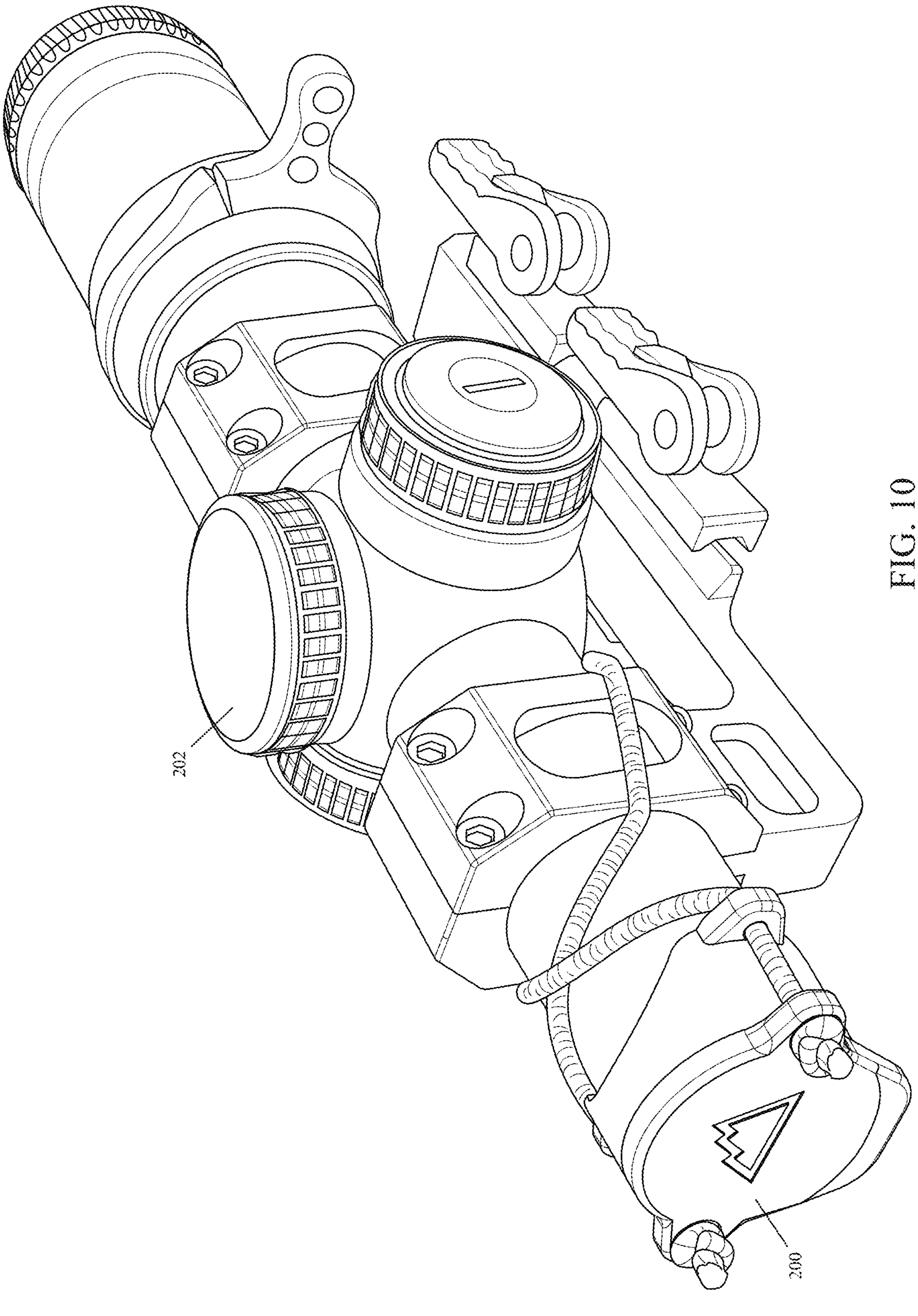
FIG. 10 illustrates a telescopic sight equipped with another lens cap assembly according to the principles of the present disclosure.
Figure 11:
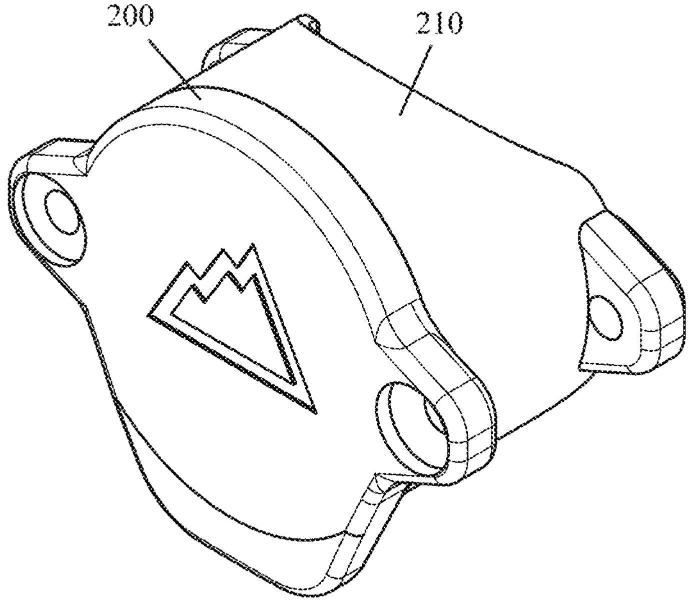
FIG. 11 illustrates an isometric view of the lens cap assembly shown in FIG. 10.
Figure 12:
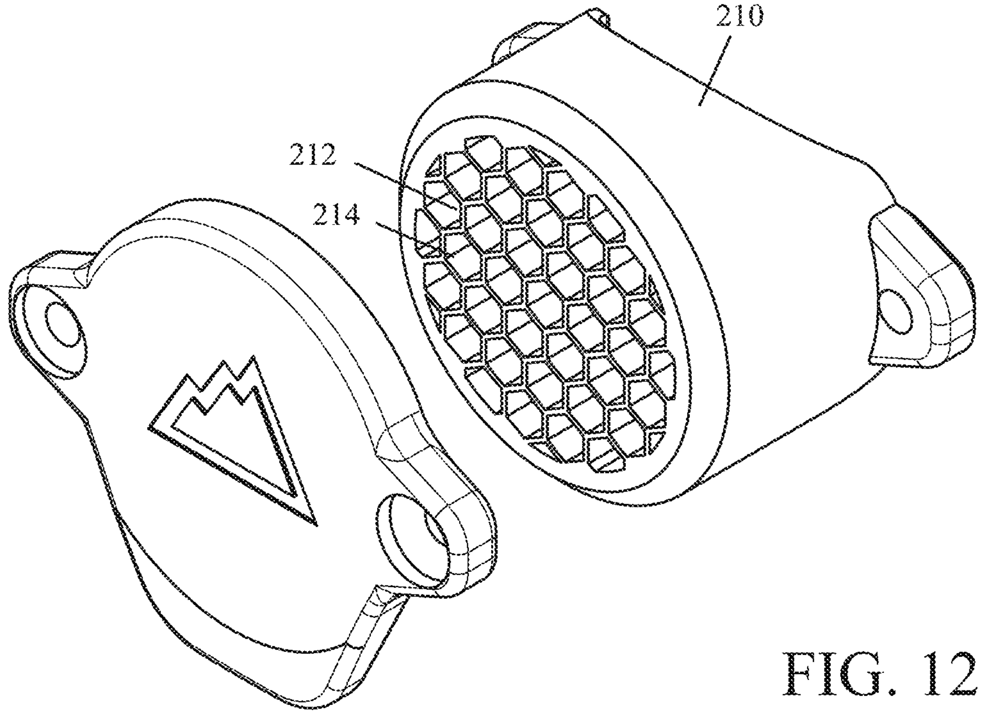
FIG. 12 illustrates an exploded view of the lens cap assembly shown in FIG. 11.
Figure 13:
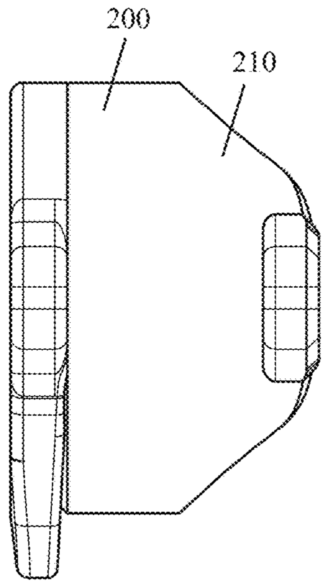
FIG. 13 illustrates a right side elevational view of the lens cap assembly shown in FIG. 11.
Figure 14:
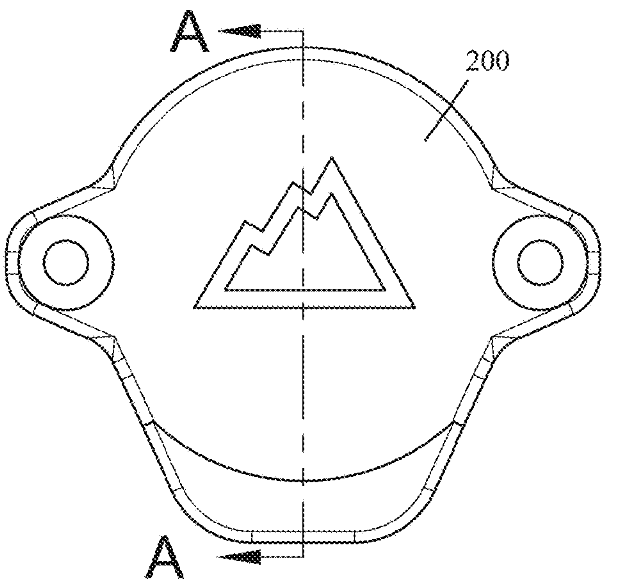
FIG. 14 illustrates a front elevational view of the lens cap assembly shown in FIG. 11.
Figure 15:
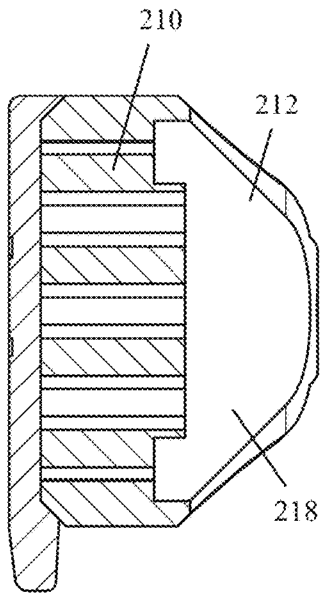
FIG. 15 illustrates a cutaway view of the lens cap assembly taken along line A-A shown in FIG. 14.
Figure 16:
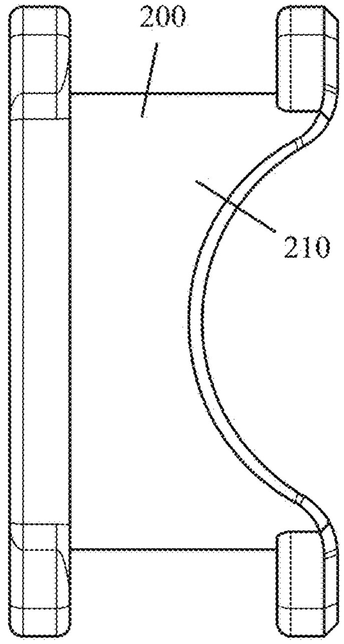
FIG. 16 illustrates a top plan view of the lens cap assembly shown in FIG. 11.
Figure 17:
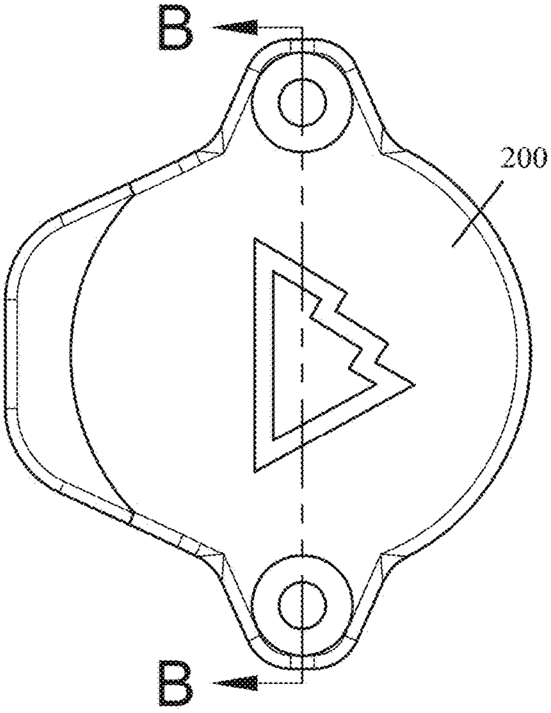
FIG. 17 illustrates another front elevational view of the lens cap assembly shown in FIG. 11.
Figure 18:
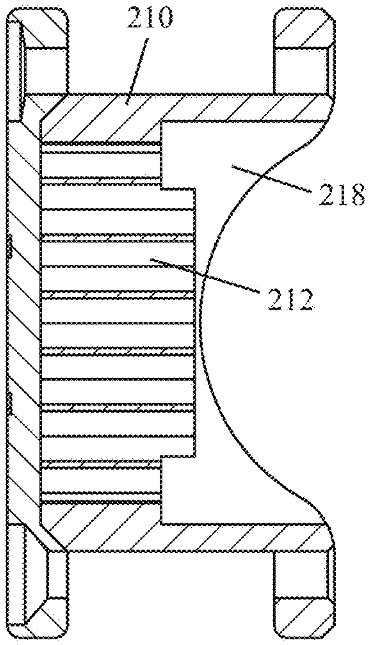
FIG. 18 illustrates a cutaway view of the lens cap assembly taken along line B-B shown in FIG. 17.
Figure 19:
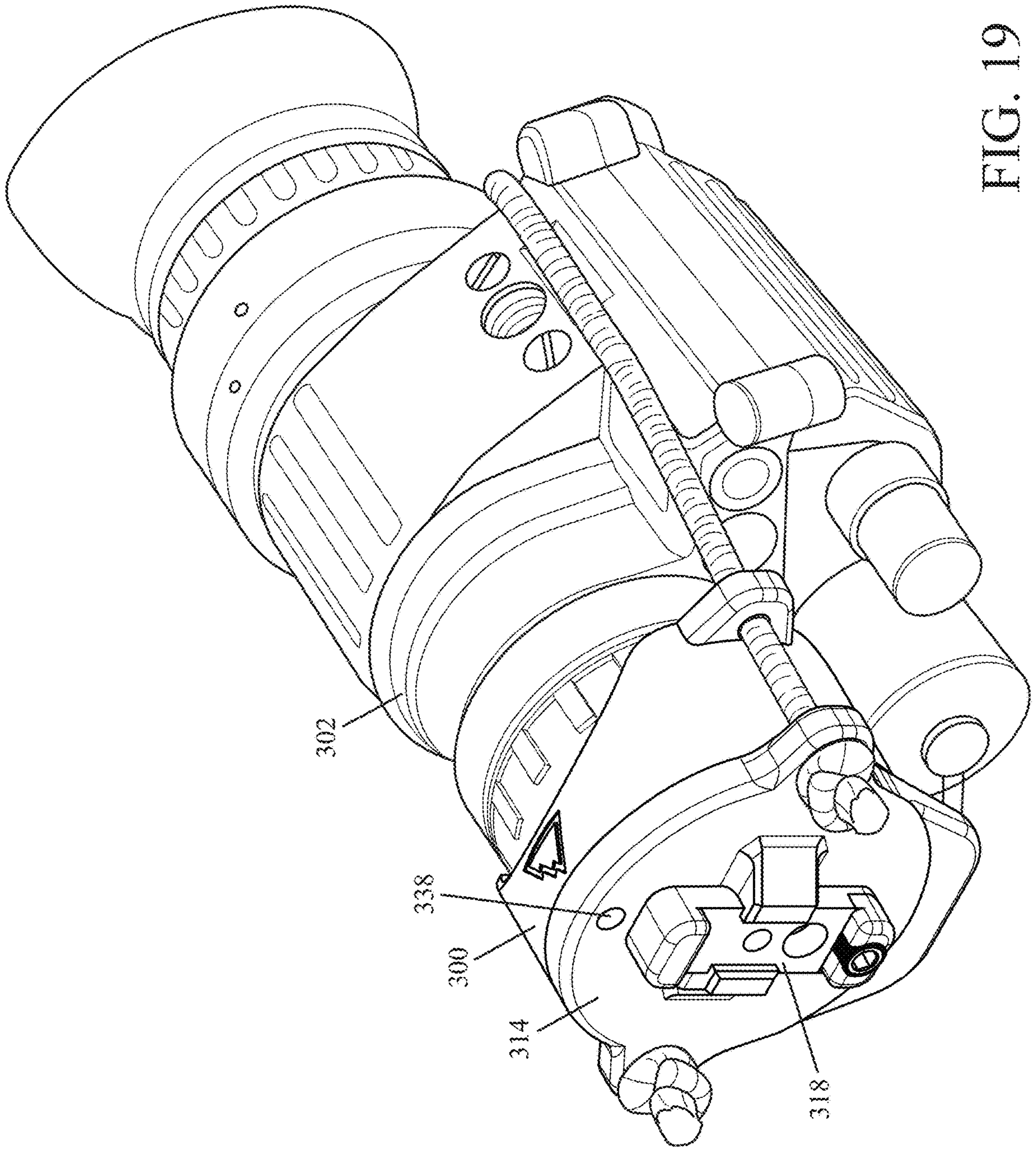
FIG. 19 illustrates a night vision device equipped with yet another lens cap assembly according to the principles of the present disclosure.
Figure 20:
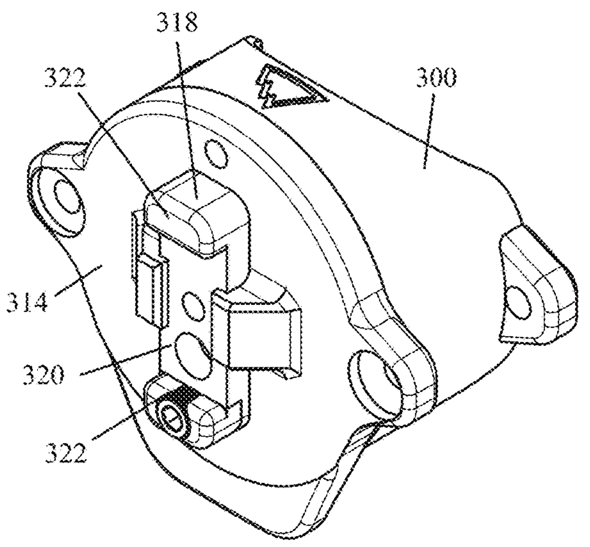
FIG. 20 illustrates an isometric view of the lens cap assembly shown in FIG. 19.
Figure 21:
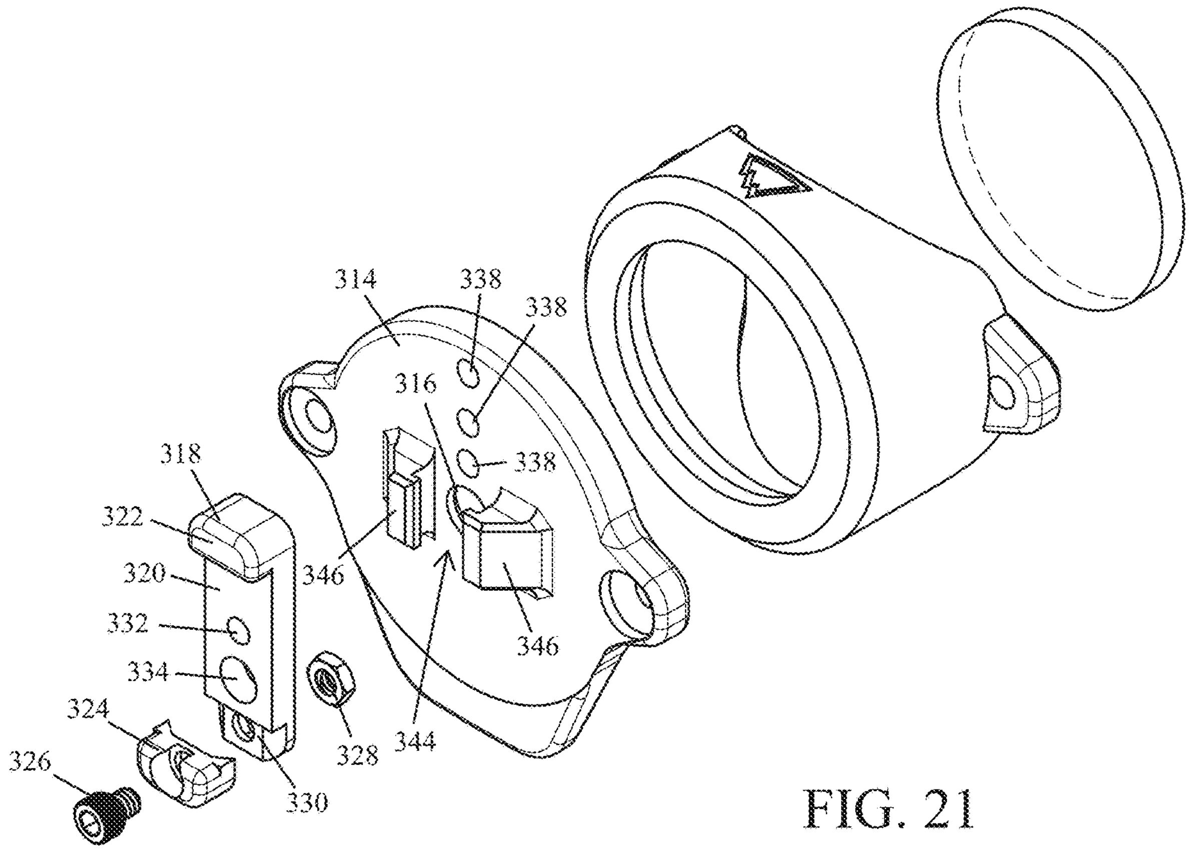
FIG. 21 illustrates an exploded view of the lens cap assembly shown in FIG. 20.
Figure 22:
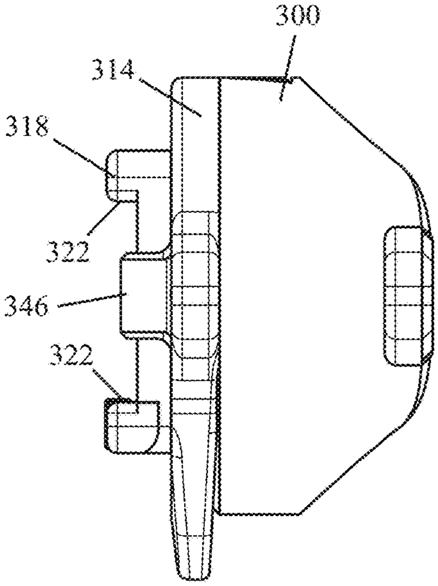
FIG. 22 illustrates a right side elevational view of the lens cap assembly shown in FIG. 20.
Figure 23:
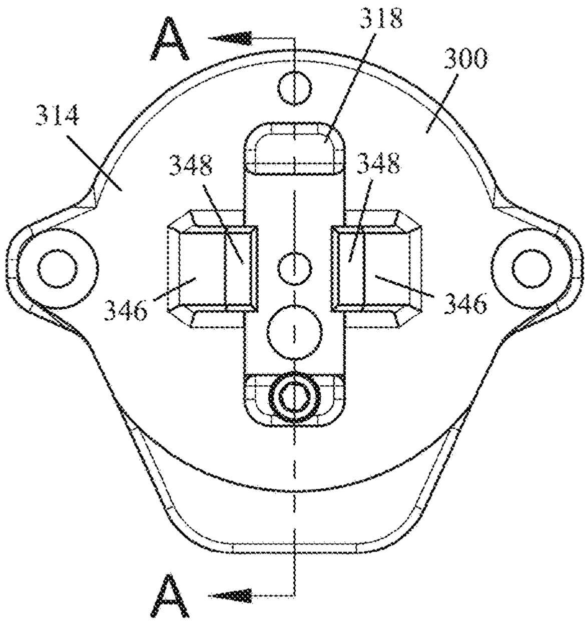
FIG. 23 illustrates a front elevational view of the lens cap assembly shown in FIG. 20.

As shown in FIGS. 6 and 9, the removable lens 112 is positioned within the bore 118 against the radially inwardly projecting ledge 124 of the sleeve 110. Preferably, the lens 112 is removably and frictionally engaged within the bore 118 of the sleeve 110. Therefore, the diameter of the lens 112 is only slightly smaller than the diameter of the bore 118 in which the lens 112 is being positioned, to allow for a tight, frictional engagement while retaining removability. The removable lens 112 is disc-shaped and preferably made of a transparent, substantially rigid material such as glass. However, the lens 112 can be made of other suitable materials, such as polycarbonate or acrylate polymer. In some implementations, the removable lens 112 may be configured to limit the color of a light beam emitted by the flashlight 102 to a particular color, such as blue or red.

As shown in FIG. 1, the cap 114 is removably secured to the front end of the sleeve 110 by the elastic cord 116. An annular chamfer 134 disposed on a backside of the removable cap 114 is configured to interface with the annular chamfer 128 on the front end of the sleeve 110 (see, e.g., FIG. 6). Together, the two chamfers (128 and 134) serve to center the cap 114 on the front end of the sleeve 110. In this way, the cap 114 is positioned to cover the removable lens 112 held by the sleeve 110. The cap 114 includes two external tabs 130 that extend laterally from opposite sides. Each tab 130 includes a thru hole 132, the purpose of which will be described in detail below. The cap 114 also includes a flipper tab 136 that extends laterally from the cap 114. The flipper tab 136 is configured so that it can be used to dislodge the cap 114 from the front end of the sleeve 110. The cap 114 is made of a thermoplastic polyurethane (TPU). However, the cap 114 can be made of other suitable materials, such as polyamide 12 (PA12).

Though the example cap 114 includes one flipper tab 136, in other implementations, the cap 114 may include two flipper tabs, each of which extend laterally from the cap 114.

As previously disclosed, the elastic cord 116 is used to removably secure the cap 114 to the front end of the sleeve 110. The elastic cord 116 is a length of 2.5 mm shock cord, though another thickness could be used. Each end 138, 140 of the elastic cord 116 extends through a pair of tabs, one external tab 120 on the sleeve 110 and one external tab 130 on the cap 114. Each end 138, 140 of the elastic cord 116 includes a stopper knot 142, preferably an overhand knot, that prevents the end of the elastic cord 116 from unreeving. When the cap 114 is dislodged from the front end of the sleeve 100, the elastic cord 116 is configured to draw the cap 114 against the side of the lens cap assembly 100.

FIGS. 10-18 illustrate another example lens cap assembly 200. This lens cap assembly 200 is configured for attachment to the objective end of a telescopic sight 202. The lens cap assembly 200 is similar to the lens cap assembly 100 discussed above, but the sleeve 210 includes an anti-reflection element 212 instead of a removable lens 112 and a radially inwardly projecting ledge 124.

The anti-reflection element 212 is configured to filter out light reflections from the objective lens of the telescopic sight 202. The anti-reflection element 212 comprises a plurality of honeycomb shaped apertures 214 positioned in-line with the bore 218 within the sleeve 210 (see, e.g., FIG. 12). However, the apertures 214 of the kill flash 212 could be square, octagonal, diamond, and the like. The plurality of apertures 214 that make up the anti-reflection element 212 are an integral portion of the sleeve 210.

The diameter of the bore 218 in the sleeve 210 will be only slightly larger than the diameter of the objective end of the telescopic sight 202 to which the lens cap assembly 200 is being attached, to allow for a tight, frictional engagement while retaining removability.

FIGS. 19-27 illustrate yet another example lens cap assembly 300. This lens cap assembly 300 is configured for attachment to the objective end of a night vision device 302. The lens cap assembly 300 is similar to the lens cap assemblies 100, 200 discussed above, in particular the lens cap assembly 100 shown in FIGS. 1-9, but the cap 314 includes an aperture 316 and a sliding member 318 that together can be used to change the focal distance of the night vision device 302. Specifically, the user may optionally toggle the sliding member 318 between a closed state and one of two open states. Each of the open states changes the focal distance of the night vision device 302.

The aperture 316 in the cap 314 is positioned to correspond with the approximate center of the objective lens of the night vision device 302. The aperture 316 is circular and has a 6 mm diameter. While the example aperture 316 has a 6 mm diameter, the diameter of the aperture 316 can vary so long as the aperture 316, at a minimum, has the same diameter as the largest aperture in the sliding member 318 discussed in detail below.

The sliding member 318 is configured (e.g., shaped and dimensioned) to slide within a guide slot 344 formed between a pair of arms 346 on a front side of the cap 314. The two arms 346 are positioned on opposite sides of the aperture 316, each having a lip 348 extending partially inward from opposing sides of the aperture 316 (see, e.g., FIG. 20).

The sliding member 318 comprises an elongate body 320 having a stop (322 and 324) on each end configured to limit the movement of the sliding member 318 between first, second and third positions. One of the stops 324 is a removable lug secured to an end of the elongate body 320 by a threaded fastener 326 and a nut 328 (see, e.g., FIG. 24). The bottom of the lug 324 includes a cutout configured to receive a mating protuberance 330 adjacent an end of the elongate body 320. The shape of the protuberance 330 prevents the lug 324 from rotating.

The elongate body 320 includes two apertures, a first aperture 332 configured to provide for a focal distance of approximately 1-5 feet and a second aperture 334 configured to provide for a focal distance of approximately 10 feet. In the preferred implementation, the first aperture 332 is 3 mm in diameter and the second aperture 334 is 5 mm in diameter. However, depending on the desired focal distance for the night vision device 302, an aperture may have a diameter greater than or less than what is listed above.

Figure 24:
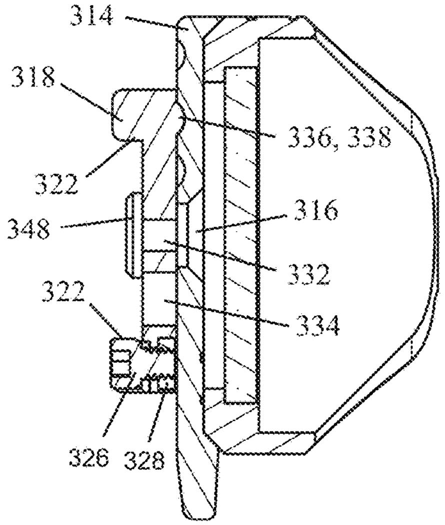
FIG. 24 illustrates a cutaway view of the lens cap assembly taken along line A-A shown in FIG. 23.
Figure 25:
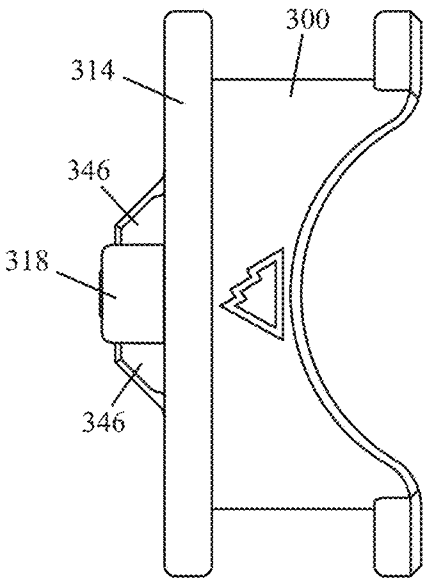
FIG. 25 illustrates a top plan view of the lens cap assembly shown in FIG. 20.
Figure 26:
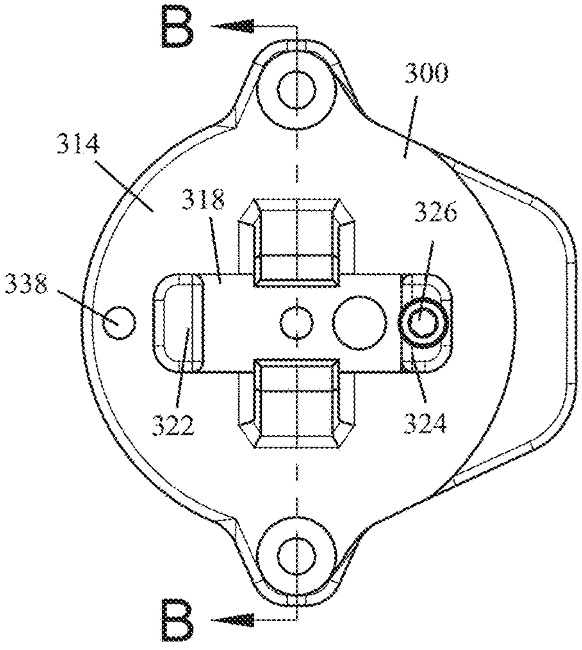
FIG. 26 illustrates another front elevational view of the lens cap assembly shown in FIG. 20.
Figure 27:
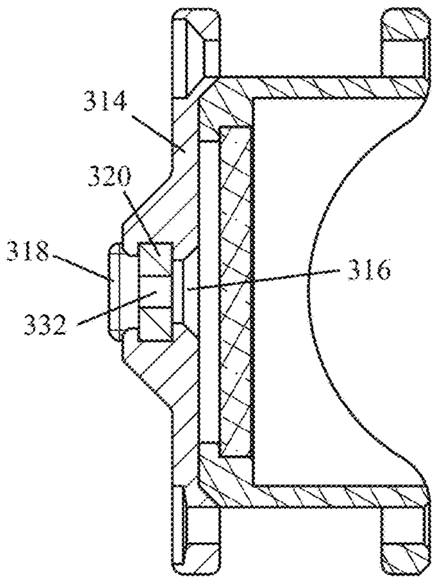
FIG. 27 illustrates a cutaway view of the lens cap assembly taken along line B-B shown in FIG. 26.

A bump 336, or rounded protuberance, is disposed on the backside of the sliding member 318 (see, e.g., FIG. 24). The bump 336 is configured to frictionally engage with one of three detents 338 in the front side of the cap 314. The rounded shape of the bump 336 allows for smooth movement and engagement, while still providing enough friction to prevent unintended sliding of the sliding member 318. The detents 336 are positioned in-line with the aperture 316 in the cap 314 (see, e.g., FIG. 21).

The sliding member 318 slides within the guide slot 344 between the first, second, and third positions. In the first position, the sliding member 318 covers the aperture 316 in the cap 314. In the second position, the first aperture 332 in the sliding member 318 overlays the aperture 316 in the cap 314 (see, e.g., FIG. 24). In the third position, the second aperture 334 in the sliding member 318 overlays the aperture 316 in the cap 314. Moving the sliding member 318 between the second and third positions changes the focal distance of the night vision device 302.

Though the example sliding member 318 includes two apertures (332 and 334), in other implementations, the sliding member 318 may have no aperture, a single aperture, or more than two apertures. The limit to the number of apertures being a function of aperture diameter and/or the length of the elongate body 320.

The foregoing description of the invention is intended to be illustrative; it is not intended to be exhaustive or to limit the claims to the precise forms disclosed. Those skilled in the relevant art can appreciate that many modifications and variations are possible in light of the foregoing description and associated drawings.

Reference throughout this specification to an "embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

The invention claimed is:

1. A lens cap assembly for an optical sight, the lens cap assembly comprising:

a sleeve configured to frictionally engage with the optical sight, the sleeve having has a bore disposed through it, wherein a front end of the sleeve includes an annular chamfer positioned around an exit opening of the bore;

an anti-reflection element configured to filter out light reflections from a lens of the optical sight, the anti-reflection element being positioned within the bore of the sleeve; and a cap removably secured to the front end of the sleeve by an elastic cord, wherein the cap includes a backside and an annular chamfer disposed on the backside configured to interface with the annular chamfer on the front end of the sleeve.

2. The lens cap assembly of claim 1, wherein the sleeve includes two external tabs that extend laterally from opposite sides of the sleeve, each of the two external tabs includes a thru hole; the cap includes two external tabs that extend laterally from opposite sides of the cap, each of the two external tabs includes a thru hole;

wherein the elastic cord extends through the holes of the external tabs of the sleeve and the cap.

3. The lens cap assembly of claim 2, wherein the cap includes a flipper tab that extends laterally from the cap, the flipper tab is configured to dislodge the cap from the front end of the sleeve.

* * * * *